April 22, 1952 W. JASTRZEBSKI 2,593,457

FLUID OPERATED POWER TRANSMITTER

Original Filed Sept. 22, 1942 6 Sheets-Sheet 1

Inventor:
W. JASTRZEBSKI

By [signature]
Attorney.

April 22, 1952 W. JASTRZEBSKI 2,593,457

FLUID OPERATED POWER TRANSMITTER

Original Filed Sept. 22, 1942 6 Sheets-Sheet 2

Inventor:
W. JASTRZEBSKI

By [signature]
Attorney.

April 22, 1952 W. JASTRZEBSKI 2,593,457

FLUID OPERATED POWER TRANSMITTER

Original Filed Sept. 22, 1942 6 Sheets-Sheet 3

Inventor:
W. JASTRZEBSKI

By [signature]

Attorney.

April 22, 1952 W. JASTRZEBSKI 2,593,457

FLUID OPERATED POWER TRANSMITTER

Original Filed Sept. 22, 1942 6 Sheets-Sheet 4

Inventor:
W. JASTRZEBSKI

By [signature]
Attorney.

April 22, 1952 W. JASTRZEBSKI 2,593,457

FLUID OPERATED POWER TRANSMITTER

Original Filed Sept. 22, 1942 6 Sheets-Sheet 5

Inventor:
W. JASTRZEBSKI

By A. W. Holcombe
Attorney.

April 22, 1952 W. JASTRZEBSKI 2,593,457

FLUID OPERATED POWER TRANSMITTER

Original Filed Sept. 22, 1942 6 Sheets-Sheet 6

Inventor:
W. JASTRZEBSKI

By [signature]
Attorney.

Patented Apr. 22, 1952 2,593,457

UNITED STATES PATENT OFFICE 2,593,457

FLUID OPERATED POWER TRANSMITTER

Wincenty Jastrzebski, Warsaw, Poland; vested in the Attorney General of the United States Original application September 22, 1942, Serial No. 459,260, now Patent No. 2,377,886, dated June 12, 1945. Divided and this application April 10, 1945, Serial No. 587,489. In France December 15, 1941

5 Claims. (Cl. 60—53)

Hydraulic change speed gears are already known wherein the change of gear ratio from a driving shaft to a driven shaft is obtained by increasing or decreasing the quantity of a liquid forced by a pump operatively connected to one of said shafts and derived from another pump operatively connected to the other shaft. With such a structure, when it is desired to increase the speed of the driven shaft, a larger quantity of liquid must be displaced from one pump into the other.

It is an object of the present invention to provide as an improvement and development of the aforesaid type of hydraulic change speed gear a novel fluid operated apparatus utilizable as a power transmitter either for imparting to a driven shaft selectively any one of an unlimited number of different speeds from a driving shaft or else as a change speed power transmitter permitting the impulse from a driving shaft to be imparted without any substantial loss of energy to a driven shaft with several different gearing ratios and also a reverse drive to be obtained.

Another object of the invention is to provide a power transmitter utilizable for miscellaneous purposes whenever the speed of a driven mechanical member requires to be varied and having a simple structure ensuring an inexpensive operation because it functions by controlling a member which regulates the circulation of a liquid, such as oil, filling the transmitter chamber capacity, said circulation resulting from the resistance which checks the motion of the driven shaft with respect to the motion to be imparted thereto by the driving shaft, to each reduction of the mass of circulating liquid corresponding an increase of the driven shaft speed, i. e., a decrease of the ratio between the respective speeds of both shafts.

Yet another object of the invention is more specifically to provide an oil operated power transmitter comprising a pair of revoluble coaxial elements movable with respect to each other and so interengaged as to delineate chambers whose total volume is constant while their partial volumes vary when one of said elements is moved with respect to the other responsive to varying resistances, said power transmitter enabling a number of different rates of speed to be imparted to a driven shaft from a driving shaft revolving at uniform speed.

A further object of the invention is to provide a novel fluid operated power transmitter as aforesaid made up of a small number of simple and rugged members affording the entire structure good operating conditions and proper durability.

A still further object of the invention is to provide a novel fluid operated power transmitter as aforesaid having a better kinetic efficiency than similar fluid operated appliances devised heretofore and so constructed as to permit a direct drive transmission without any relative displacement of members and without any liquid (oil) circulation.

With these and such other objects in view as will incidentally appear hereafter, the invention comprises more particularly the novel construction, combination and arrangements of parts that will be now described in detail with reference to the accompanying diagrammatic sheets of drawings exemplifying several embodiments of the same and forming a part of the present disclosure.

Figures 3, 4, 5, 8A, 8B, 8C:
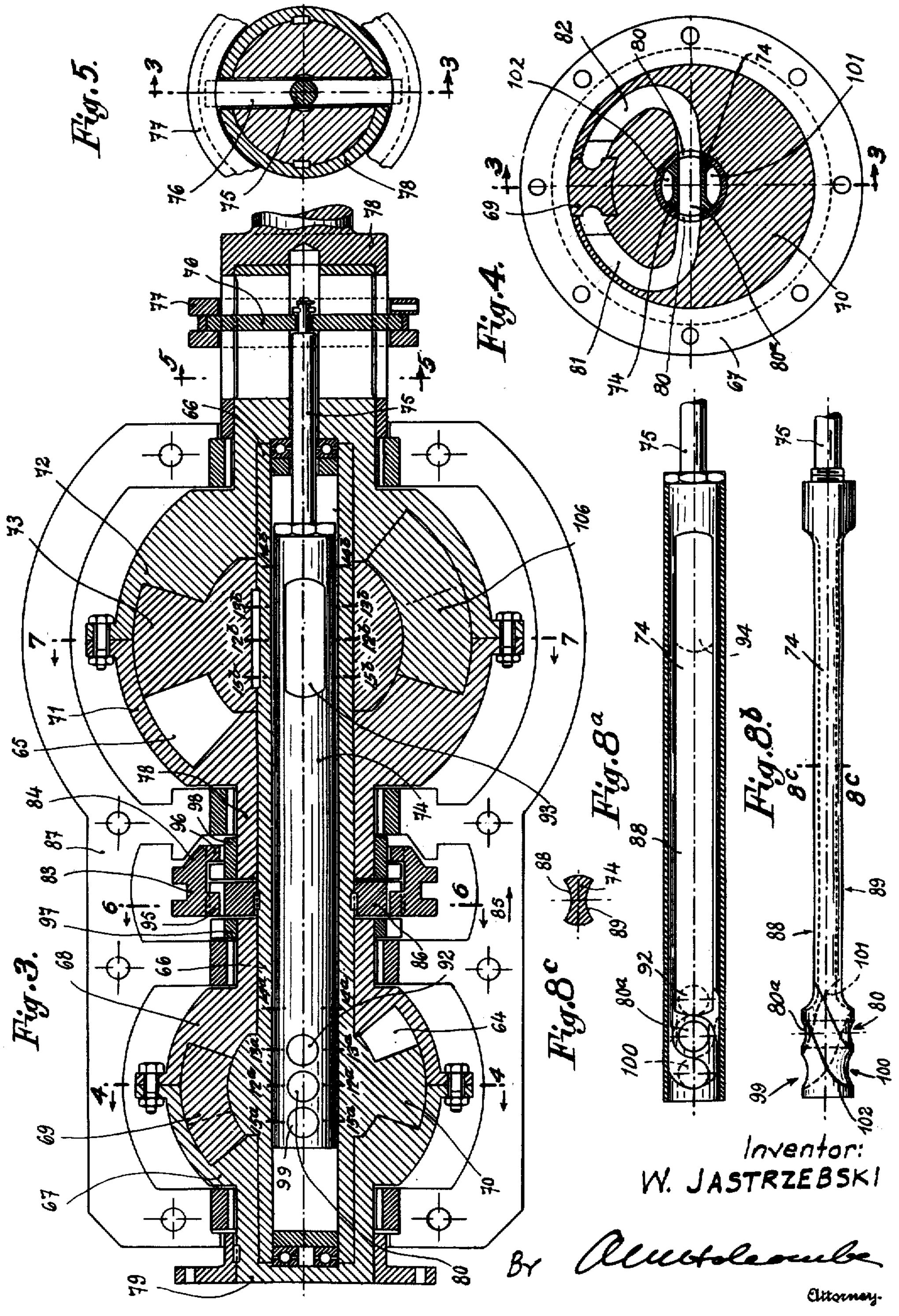
Figure 3 is a longitudinal sectional view on the line 3—3 of Figs. 4, 5, 6 and 7 of a power transmitter forming an entire gear box according to the invention.

Figures 4, 5, 6 and 7 are respectively transverse sectional views along lines 4—4, 5—5, 6—6, and 7—7 of Figure 3, showing the members included in the section planes, those situated rearwardly in other planes being omitted.

Figures 8*a*, 8*b* and 8*c* are views of the cylindrical valve shown respectively in longitudinal elevation with a section through the casing, assuming the casing to be omitted and after a rotation of 90° about its axis and in section along the line 8*c*—8*c* of Fig. 8*b*.

Figures 7, 12A, 12B, 13A, 13B, 14A, 14B, 15A, 15B, 16:
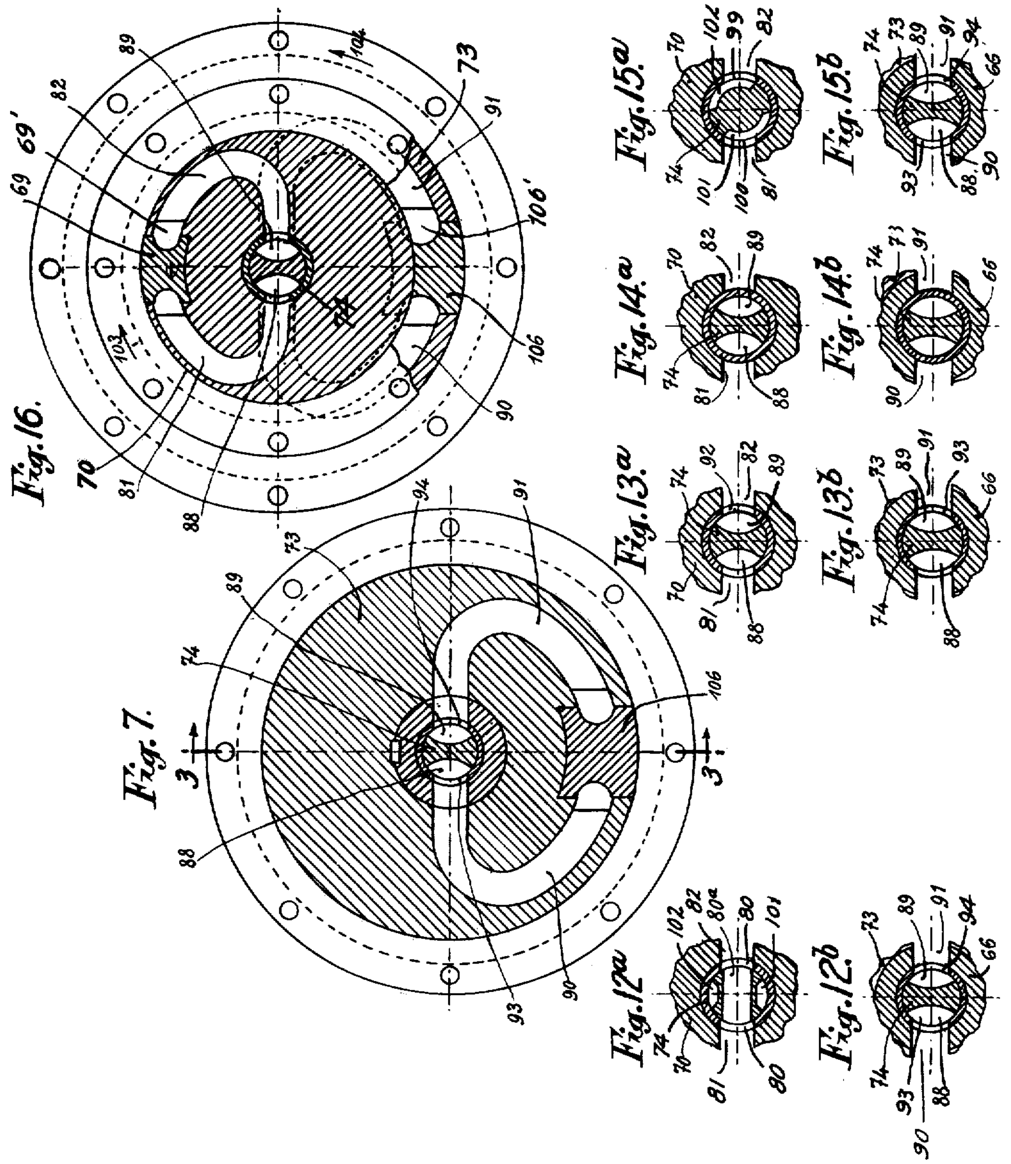
Figure 9:
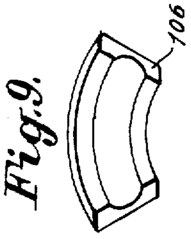
Figure 10:
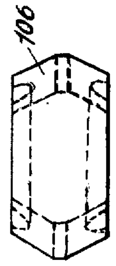
Figure 11:
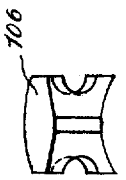
Figures 25A, 25B, 26A, 26B, 27A, 27B, 28A, 28B, 29A, 29B:
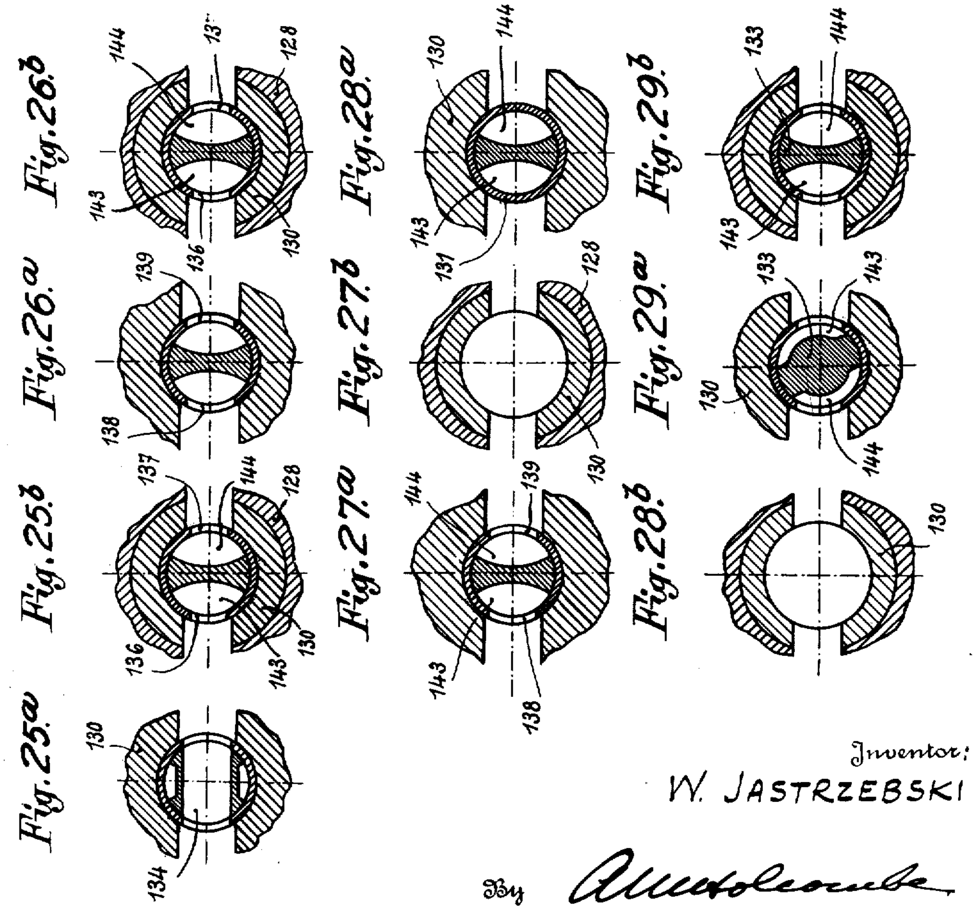

Figures 9, 10 and 11 are views of the movable partition which is visible in Fig. 7 shown respectively in elevational, end and top plan views.

Figures 12*a*, 13*a*, 14*a*, 15*a*, 12*b*, 13*b*, 14*b* and 15*b* are transverse sectional views of the cylindrical valve taken respectively along the lines 12*a*—12*a*, 13*a*—13*a*, 14*a*—14*a*, 15*a*—15*a*, 12*b*—12*b*, 13*b*—13*b*, 14*b*—14*b* and 15*b*—15*b* of Fig. 3 in positions corresponding to the line 4—4 of Fig. 3 for the sections bearing the reference *a* and to the line 7—7 of Fig. 3 for the sections bearing the reference *b*, said positions being occupied after such displacements as are effected to provide idle run, first speed, second speed and reverse respectively.

Figure 16 is an explanatory view setting forth the operation of the power transmitter resulting from the superposition of the sectional views shown by Figs. 12 and 15.

Figure 18:
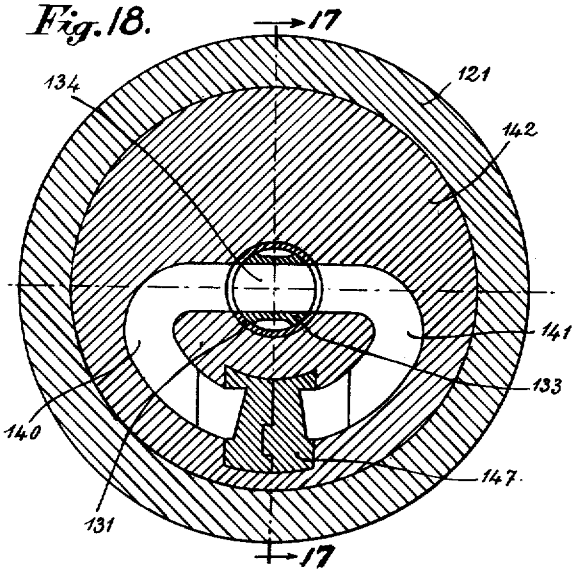
Figure 20:
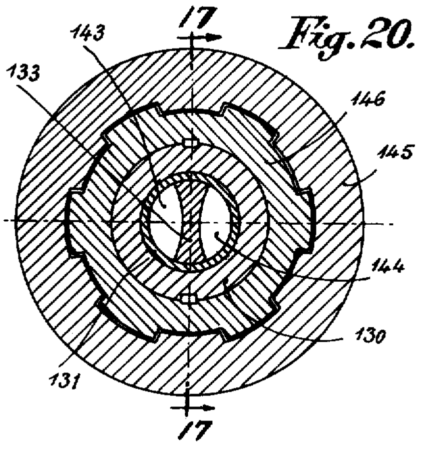
Figure 19:
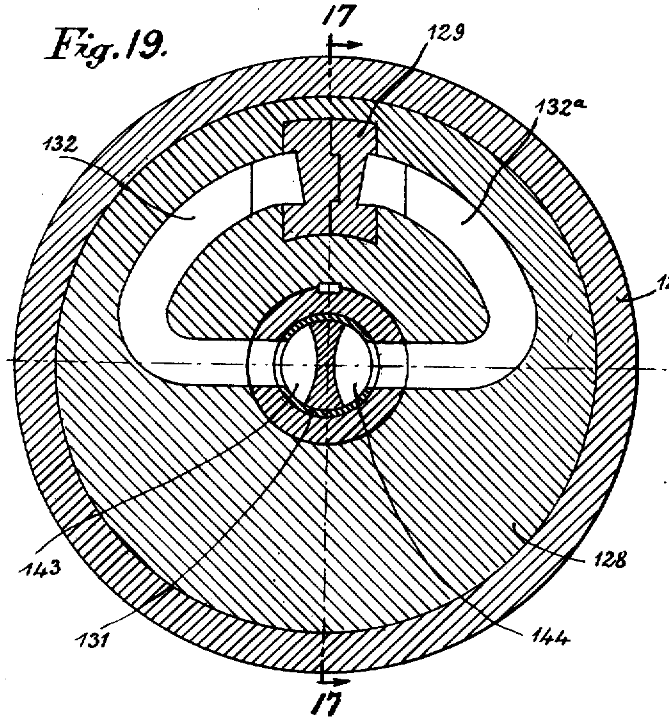
Figure 6:
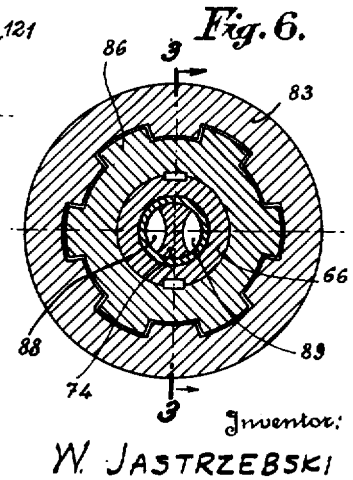
Figures 17, 21:
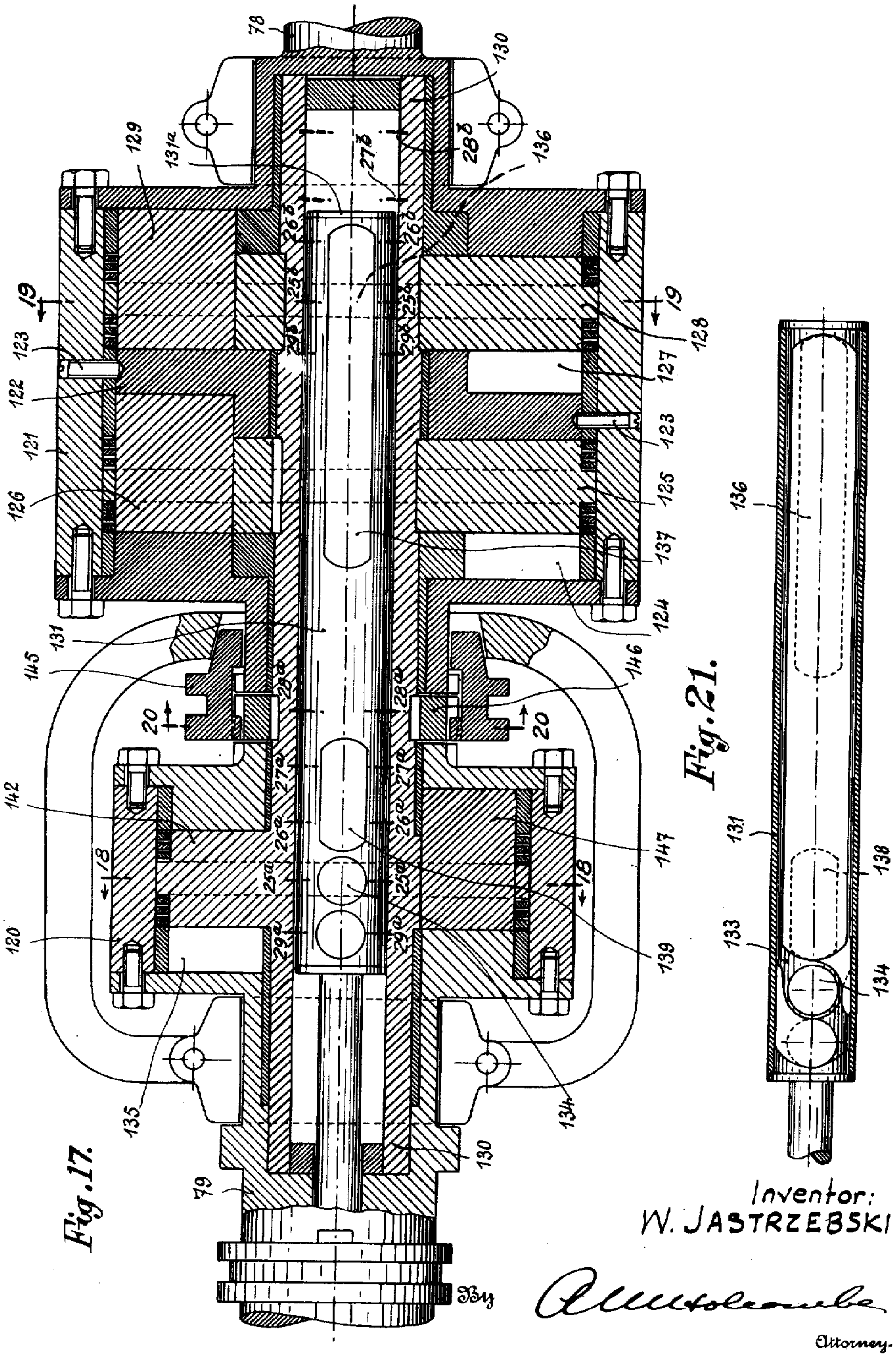

Figure 17 is a longitudinal sectional view on the line 17—17 of Figs. 18, 19 and 20 of a further constructional modification of a power transmitter according to the invention.

Figures 18, 19 and 20 are transverse sectional views respectively taken along lines 18—18, 19—19 and 20—20 of Fig. 17.

Figure 21 is a separate view of the cylindrical valve, its casing being shown in section.

Figures 22, 23, 24:
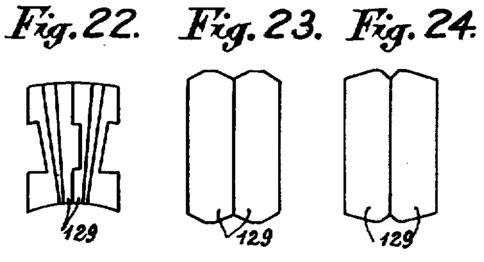

Figures 22, 23 and 24 are views of the movable partition visible in Fig. 19 taken respectively in end view, in top plan view and in lower plan view.

Figures 25*a*, 26*a*, 27*a*, 28*a*, 29*a*, 25*b*, 26*b*, 27*b*, 28*b* and 29*b* are transverse sectional views of the cylindrical valve taken respectively along the lines 25*a*—25*a*, 26*a*—26*a*, 27*a*—27*a*, 28*a*—28*a*, 29*a*—29*a*, 25*b*—25*b*, 26*b*—26*b*, 27*b*—27*b*, 28*b*—28*b*, and 29*b*—29*b* of Fig. 17 in the positions corresponding to line 18—18 of said figure for sections referenced by *a* and to line 19—19 of the same figure for sections referenced by *b*, such positions being those assumed after the displacements effected to obtain the idle run, the first speed, the second speed, the third speed and the reverse respectively.

Figures 1, 2:
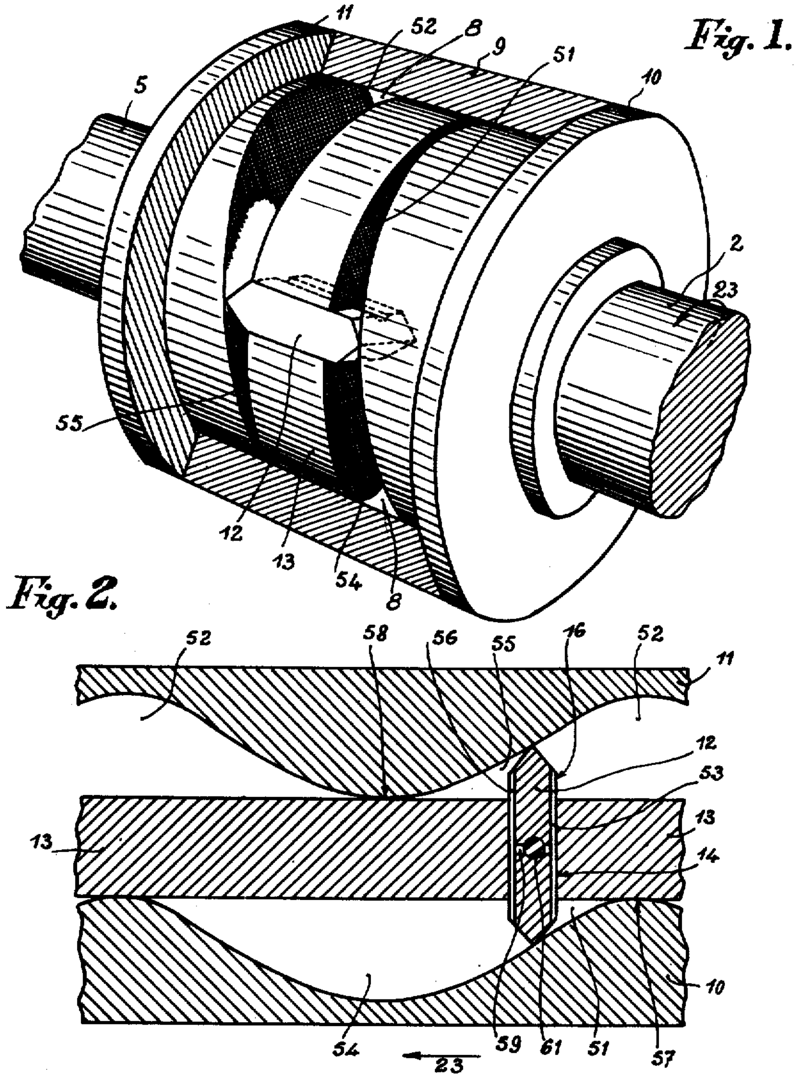
Figure 1 is a perspective diagrammatic view, partly broken away, forming an illustrative embodiment to show the operation of an essential part of the power transmitter according to the invention.
Figure 2 is an explanatory diagram designed to facilitate an understanding of the operation of the illustrative embodiment in Figure 1.

In the illustrative embodiment of a power transmitter shown in Fig. 1, there is provided a shaft 2 to which is rigidly secured a casing 9 having end plates 10 and 11 forming the end closures of the chamber 8 inside the casing. The inner surfaces of the plates 10, 11 have arcuate sinusoidal outlines substantially as shown in Fig. 2.

Each arcuate surface may be considered as generated by a straight line extending through and at right angles to the axis of the shaft 2 and to which is imparted a sinusoidal motion whose amplitude bears a certain ration ratio to the unevenness of the plate surface.

Extending into the casing 9 and revoluble therein is a second shaft 5 which carries a circular disk-shaped divider 13 having a thickness equal to the interval (Fig. 2) between the plates at right angles to its axis and tangent to the crests or uppermost points of the undulated surfaces of the plates 10, 11. The disk 13 provides fluid tightness along its lines of contact and splits the chamber 8 into a pair of compartments. Said disk 13 has a radial notch 14 in which is snugly received the partition 12 which is freely slidable therein parallel to the axis of the shaft 5 and divides in turn each compartment into a pair of sub-compartments. Partition 12 is adapted to slide between the undulated plates while providing a fluid tight seal between them and also between casing 9 and shaft 5.

In considering the operation of structure shown in Fig. 2 an examination of this diagram shows that the sub-compartments 51, 52 defined on opposite sides of the disk 13 and to the right of the partition 12 communicate through a port 53 formed in the right hand face of said partition while the sub-compartments 54, 55 also defined on opposite sides of the disk 13 but to the left of the partition 12 similarly communicate with each other through a port 56 formed in the left hand face of said partition. The longitudinal ports 53, 56 are interconnected by a transverse port 59 whose sectional area is controlled by valve means such as a cock 61.

Assuming the shaft 2 to rotatably drive the plates 10, 11 in the direction indicated by the arrow 23, it will be understood that the action of their undulated surfaces tends to reduce the volume of the sub-compartments 51, 52 in proportion as their lines of contact 57, 58 with the disk 13 are moved toward the partition 12. This reduction of volume is obviously accompanied by an increase of pressure of the fluid which fills said sub-compartments and which has a tendency to leak out through the ports 53, 59 and 56 into the sub-compartments 54, 55 whose volume gradually increases exactly in terms of the extent of gradual reduction of the volume of the sub-compartments 51, 52.

Assuming all the sub-compartments to be filled with oil or an equivalent liquid, a circulatory motion is imparted to the oil from the sub-compartments situated on one side of the partition 12 to those situated on the opposite side.

If now by means of the cock 61 the port 59 is fully closed, the flow of oil is intercepted therethrough. As a result of this, there is created inside the sub-compartments 51, 52 an oil overpressure which at once reacts against the partition 12 and sets it into motion. This partition is therefore moved and drives with it the disk 13 at a speed equal to that of the plates 10, 11. Should now the port 59 be only partly closed by the cock 61, the oil circulation from the chambers 51, 52 toward the chambers 54, 55 is merely slowed down, this resulting in a rotary sliding motion of the disk 13 with respect to the plates 10, 11.

In the actual or practical embodiments of the invention fluid communication from one side of partition 12 to the opposite side is not by way of a passage 59 extending through the partition itself, but instead by way of passages extending from the ports 53 and 56 through the body of the disk 13 and terminating adjacent the center or axis of the disk where the flow of liquid therethrough can be controlled by a valve slidable along the axis of the shaft 5, as will be more fully described hereafter. Also in such embodiments of the invention, I provide other passages extending along the axis of the shaft 5 and controlled by the slidable valve whereby communication is established from subcompartments 51 and 52 to a point outside of the casing 9 and also from subcompartments 54 and 55 to a point outside of the casing 9.

If such a structure be visualized and if it be assumed that the shaft 5 be held stationary and a force be applied to turn the shaft 2 and casing 9 in the direction of the arrow 23, it is apparent that liquid will be forced from subcompartments 51 and 52 to some point out of the casing and liquid will be drawn from some point outside the casing into subcompartments 54 and 55. In other words, the device of Fig. 1 operates under such circumstances as a fluid pump establishing a forced circulation of fluid into and out of the casing 9.

Such a pump may obviously be used to operate a fluid motor and such a motor may be of similar or identical construction as that shown in Figs. 1 and 2. In considering the operation of such structure as a motor let it be assumed that shaft 5 is again held stationary and shaft 2 which is rotatable is connected with the part to be driven. The subcompartments 54 and 55 are connected through the passages above described with the high pressure side of the pump so that liquid will be forced into these subcompartments while subcompartments 51 and 52 are connected with the low pressure side of the pump. It is apparent that due to differences in pressure on the movable walls of the subcompartments that the casing 9 and shaft 2 will rotate in the direction of the arrow 23.

In the embodiments of the power transmitters hereinafter described I make use of both pump and motor elements operating in the manner and in accordance with the principles above explained.

The power transmitter shown in Figs. 3 to 16 possesses speed changing characteristics and is adapted fully to transmit power when the speeds of the driving and driven shafts are in inverse ratio to the capacities of the two chambers connected to the respective shafts.

The power transmitter shown in Fig. 3 is made up of a pair of chambers 64, 65 having arcuate walls and different capacities, mounted for rotation on a tubular shaft 66 and having intercommunication as will be described hereafter.

The smaller chamber 64 is defined by a pair of shell members 67, 68 having walls so cut as to present undulated faces between which is arranged a sector-shaped partition 69 movable parallel to the axis of said chamber 64 and to which is imparted an oscillatory motion relative to the chamber center. Such partition 69 which ensures fluid tightness between the chamber walls is housed in a recess provided to that effect in a disk 70 rigidly carried by the tubular shaft 66 and revolubly housed in the chamber 64.

Inside the larger chamber 65 defined by the two shell members 71, 72 are accommodated a disk 73 and a partition 106 movably arranged between walls similar to those of the chamber 64. The partitions 69 and 106 are each formed with side grooves 69′ and 106′ respectively to form passages connecting corresponding opposite sides of the discs 70 and 73 and each of such passages communicates with a respective channel in the disc, i. e. channel 81 and channel 82 in disc 70 and channel 90 and channel 91 in disc 73 (see Fig. 16).

Inside the tubular shaft 66 is housed for longitudinal motion a cylindrical valve 74 which enables the rate of flow of the liquid between the compartments of one and the same chamber or of a pair of different chambers as well as the direction of circulation of the liquid between the large chamber compartment to be adjusted.

In order to bring the cylindrical valve 74 to the different positions corresponding to idle run, low gear ratio, high gear ratio and reverse run, the displacement of said valve 74 is controlled by a rod 75 fixed by a key 76 to a ring 77 slidably mounted on the driven shaft 78.

Where the power transmitter is used as a change speed gear on a vehicle, the smaller chamber 64 of the transmitter unit is coupled at the left hand side end with the power or driving shaft 79 while its larger chamber is coupled at the right hand side end with the driven shaft 78.

Should the engine of the vehicle be started while the cylindrical valve 74 is in the position shown in Fig. 3, the vehicle cannot be set into motion because inside the chamber 64 which rotates together with the driving shaft 79 the liquid freely circulates from one face to the other face of the movable partition 69 through the channel 80 of the cylindrical valve 74 (Fig. 12) and through channels 81, 82 formed in the disk 70 which remains stationary.

Assuming now the toothed annular shell 83 of the bevel clutch 84 to be pushed in the direction shown by the arrow 85 through the toothed disk 86 (Fig. 3) keyed to the tubular shaft 66 and said shaft to be held motionless with respect to the frame 87 of the apparatus and assuming furthermore the cylindrical valve 74 to be moved in a direction opposite to that shown by the arrow 85 so as progressively to close off direct flow of the liquid through the smaller chamber 64, the liquid circulation will be set up from the smaller chamber 64 toward the larger chamber 65 through the side channels 88, 89 (Fig. 15) in the valve 74. The path followed by the liquid will be therefore as follows: Channel 81 in disk 70 (Fig. 24), side channel 88 in valve 74, channel 90 in disk 73 (Fig. 15), chamber 65, channel 91 in disk 73, channel 89 in valve 74, and channel 82 in disk 70.

Owing to the reactive stress exerted by the liquid against the walls of the chamber 65 whose casing is mounted upon the driven shaft 78, the vehicle will be started and will take up a speed which will increase at the same time as the rate of flow between the chambers 64 and 65, i. e. at the same time as the relative speeds between larger chamber 65 and smaller chamber 64.

Should the cylindrical valve 74 be so moved as to cause the ports 92 (Fig. 3) to replace the ports 80 and to establish communication with the channels 81, 82 in the disk 70, direct communication of the liquid through the smaller chamber 64 will be cut off. The full quantity of liquid will flow through the larger chamber 65 owing to the provision of the side channels 88, 89 and will impart thereto a motion whose speed will be in inverse ratio to the relative capacities of both chambers 64, 65.

It will be noticed that owing to the larger radius and the larger pressure surface in the larger chamber 65, the energy is transmitted without any substantial loss.

In order to further increase the speed of the chamber 65, the driven shaft 78 may be freed by shifting the bevel gear in a direction reverse of that of the arrow 85 and the cylindrical valve 74 may be further moved in the same direction. When the parts 92 no longer register with channels 81 and 82 and side ports 93, 94 are no longer opposite the respective ports of the channels 90, 91 (Figs. 15 and 22) in the disk 73, the liquid flow is cut off intermediate the chambers 64, 65.

After the liquid flow has thus been cut off, both chambers 64, 65 and the tubular shaft 66 revolve at the same speed. By moving the clutch gear 83 in a direction reverse to that shown by the arrow 85, a direct drive is secured since owing to the intermeshing of the gears 95, 96 the toothed wheels 97, 98 respectively connected to the driving shaft 79 and the driven shaft 78 are coupled up. At that moment, the liquid pressure inside the chambers is equal to zero.

In order to obtain a reverse drive, the cylindrical valve 74 must be moved in the direction shown by the arrow 85 until the ports 99, 100 assume the position opposite channel 81 and 82, respectively. The clutch 83 should be moved in the same direction to connect up the tubular shaft 66 of the frame 87.

When the port 99 coincides with the channel 81 in the disk 70, the liquid flows through the slanting channel 101 toward the side channel 89 formed in the opposite face of the cylindrical valve 74. Conversely the channel 82 is set into communication with the other side channel 88 through the other slanting channel 102. The direction of the liquid flow through the chamber 65 is therefore reverse to its previous direction of flow.

This change of flow direction involves a change in the direction of revolution of the chamber 65 with respect to its previous direction of revolution. The reverse drive of the vehicle fitted with such a power transmitter is thus obtained.

Assuming the cylindrical valve 74 to occupy the position shown in Fig. 3 (idle run position) and said valve to be brought to the position corresponding for example to the lower gear ratio and assuming, moreover, the driving shaft 79 to revolve in the direction shown by the arrow 103 (Fig. 16) the smaller chamber 64 will rotate in the same direction. As pressure prevails in the channels 81, 88, 90, the larger chamber is driven in the same direction.

Should now the cylinder valve 74 be so moved as to bring the ports 99, 100 to the locations occupied by those of the channel 80, the pressure will prevail in the channels 81, 89, 91 and the larger chamber will revolve in the direction indicated by the arrow 104.

It will be seen that the twin chamber change gear power transmitter as above described enables an unlimited number of gearing ratios to be obtained during which the powers of the driving and driven shafts are proportional to the speeds of said shafts. Moreover, said transmitter permits two gearing ratios, i. e., two rates of speed to be secured, namely a direct drive, and a drive which is inversely proportional to the capacity of the two chambers.

The constructional modification shown in Figs. 17 to 29 is based on the same operational principle and is adapted to fully transmit the power received for three set rates of speed and to obtain an unlimited number of gearing ratios but with a decrease in the power.

In this constructional modification of the power transmitter there are provided a smaller chamber 120 (Fig. 17) and a larger double chamber 121. The capacity of said larger chamber is split into a pair of compartments by a partition 122 held stationary or rigid with the casing of chamber 121 by securing means such as dowel pins 123.

In the compartment 124 are revolubly arranged a disk 125 and its movable partition 126 while in the other compartment 127 are revolubly arranged a disk 128 and its movable partition 129. These two disks are rigidly connected to a tubular shaft 130 in which is movably housed a cylindrical valve 131. As shown in Fig. 21, said valve comprises a sleeve 131 surrounding a core 133 having a port 134 for idle running conditions and more or less elongated grooves providing direct or reverse communication between the compartment 135 in the smaller chamber 120 and the compartments 124, 127 in the larger chamber 121. The channels 136, 137 facing the larger chamber have a particularly elongated shape as well as those 138, 139 in front of which are the ends of the channels 140, 141 (Fig. 18) in the disk 142 which drives the movable partition 147.

The channels 143, 144 establish communication between the compartments defined in the smaller and larger chambers as shown in each particular instance by the detailed Figures 25*a*, 25*b* to 29*a* and 29*b*.

A power transmitter thus constructed is also provided with a conical toothed wheel 145 whose axial displacement provides or fails to provide a connection between the chambers 120, 121 and the toothed annular wheel 146 secured to the shaft 130.

When shifting the cylindrical valve 131 to match requirements, a flow of liquid is established between the smaller chamber 120 and the two compartments 124, 127 of the larger chamber 121 or else such flow is reduced to the flow between the smaller chamber 120 and one compartment of the larger chamber 121. The partitioning of the larger chamber into a pair of compartments permits three gear ratios to be obtained and a full transmission of the input power to be secured. Such gear ratios are as follows: Firstly, a direct drive. Secondily, a gear ratio which is in inverse terms of the capacity of the chambers 120, 121. Thirdly, a gear ratio which is in inverse terms of the capacity of the smaller chamber 120 with respect to that of one of the compartments in the larger chamber 121.

The operation of this power transmitter is substantially the same as the one of the transmitter shown in Figs. 3 to 16 with the exception that during operation with the upper gear ratio the extreme compartment 127 of the larger chamber 121 does not operate.

It will be understood that in order to obtain the upper gear ratio, the cylindrical valve 131 must be so shifted as to bring the line 35*a*—35*a* of Fig. 25 to the location of the line 33*a*—33*a*. The end 131*a* of said valve then entirely projects from the port of the channels 132, 132*a* (Fig. 19) in the outermost disk 128 of the larger chamber 121 and does away with any communication between the smaller chamber 120 and the compartment 127 in said larger chamber.

Such a motion imparted to the cylindrical valve 131 provides a direct communication between both faces of the movable partition 129 defining the compartment 127 so that the liquid therein flows without producing any effect as in the smaller chamber 120 during idle run.

Therefore the capacity of the larger chamber 121 is reduced as it were by comparison with the capacity of the smaller chamber 120. The speed of the driven shaft is consequently enhanced.

It will be seen that a power transmitter as above described enables the several objects of the invention to be fulfilled and particularly the following results to be obtained, namely:

(a) An unlimited number of transmission ratios between a driving shaft and a driven shaft;

(b) Three different rates of speed or transmission ratios without any reduction of power;

(c) A selective reverse in the direction of rotation.

The present application is divided out of a pending application of Wincenty Jastrzebski, Serial No. 459,260, filed September 22, 1942, for Fluid Operated Power Transmitter, which application eventuated into Patent No. 2,377,886.

I claim the following as my invention:

1. A power transmitter comprising in combination with a supporting frame, of a driving shaft and a driven shaft carried by said frame, two casings rigid with the respective shafts and defining a pair of fluid-containing chambers of unequal capacities having circular peripheral surfaces and substantially sinusoidally curved end surfaces, a dividing structure for each of said chambers comprising a circular divider revolubly fitted in each chamber in contact with the end surfaces and splitting the chamber into a pair of compartments and a partition carried by the divider and slidable between two extreme positions and serving in all intermediate positions to divide each compartment into subcompartments, said structure being formed with passages connecting the two subcompartments at one side of the partition and connecting the two subcompartments at the opposite of the partition, a hollow shaft rotatable with said dividers, and having ports therein, and said dividers being formed with channels each forming a communication between a passage and the interior of said shaft through a port, a valve movable lengthwise through said hollow shaft, said valve being formed with ports and passages for conducting fluid in one position of said valve from the subcompartments on one side of the partition of one chamber to the subcompartments on one side of the partition of the other chamber and from the subcompartments on the other side of the partition of the other chamber to the subcompartments on the other side of the partition of the other chamber and movable means for connecting said hollow shaft and dividers to said frame to hold the same stationary, whereby one casing and its dividing structure acts as a pump driven by the driving shaft and the other casing and its dividing structure as a motor driven by the pump.

2. The power transmitter as set forth in claim 1 wherein said valve is also formed with ports and passages for conducting fluid in a second position of said valve from the subcompartments on said one side of the partition of said one chamber, to the subcompartments on the other side of the partition of the other chamber and from the one side of the partition of the other chamber to the other side of the partition of the one chamber whereby the pump serves to drive the motor in the opposite direction.

3. The power transmitter set forth in claim 2 wherein said valve is also formed with ports and passages for forming direct communication between the channels of the divider of the said one chamber for idle running and said valve is also adapted to cut off all flow through the channels in both chambers whereby said casings are connected to rotate as a unit.

4. The power transmitter set forth in claim 3 wherein said casings are arranged end to end and said movable means is a ring clutch surrounding said shaft between the casings and movable into one position to connect the hollow shaft to the frame and into another position to couple said casings directly to one another.

5. A power transmitter comprising in combination with a supporting frame, of a driving and driven shaft supported by said frame, two casings rigid with the respective shafts and defining fluid defining chambers of unequal capacities having circular peripheral surfaces and substantially sinusoidally curved paralleled end surfaces, the larger chamber associated with the driven shaft being subdivided by a partition rigid with the casing into two similarly built chambers, a dividing structure for each of said chambers comprising a circular divider revolubly fitted in each chamber in contact with the end surfaces and splitting the chamber into a pair of compartments and a partition carried by the divider and slidable between two extreme positions and serving in all intermediate positions to divide each compartment into subcompartments, said structure being formed with passages connecting the two subcompartments at one side of the partition and connecting the two subcompartments at the opposite of the partition, a hollow shaft rotatable with said dividers and having ports therein and said dividers being formed with channels each forming a communication between a passage and the interior of the shaft through a port, a valve movable lengthwise through said hollow shaft, said valve having ports and passages operable in different positions of said valve to form direct communication between the channels of the divider associated with the driving shaft for idle running, to conduct fluid from one side of the partition in the smaller chamber to one side of the partition in one or both of the other chambers and from the other side of said last named partition to the other side of the partition in the smaller chamber while at the same time, directly connecting the channels in the divider of a chamber not supplied from the smaller chamber to short circuit the same, for forward driving of the driven shaft at different speeds; to conduct fluid from the one side of the partition in the smaller chamber to the other side of the other partitions and from the one side of the other partitions to the other side of the partition in the smaller chamber for driving in a reverse direction and clutching means, movable into one position to connect the hollow shaft with the frame for holding the shaft stationary and into another position to couple said casings together for direct drive.

WINCENTY JASTRZEBSKI.

REFERENCES CITED

The following references are of record in the file of this patent:

UNITED STATES PATENTS

| Number | Name | Date |
|---|---|---|
| 761,512 | Lecompte | May 31, 1904 |
| 1,365,553 | Sheriff | Jan. 11, 1921 |
| 1,571,954 | Lambert | Feb. 9, 1926 |
| 1,603,179 | Wingquist | Oct. 12, 1926 |
| 1,954,793 | Averin | Apr. 17, 1934 |

FOREIGN PATENTS

| Number | Country | Date |
|---|---|---|
| 24,522 | Great Britain | Dec. 23, 1914 |
| 405,823 | Great Britain | Feb. 15, 1934 |